United States Patent

Johnson et al.

[15] 3,648,648

[45] Mar. 14, 1972

[54] DRUM BREADER

[72] Inventors: Richard T. Johnson, Sandusky; Fred Fetzer, Strongsville, both of Ohio

[73] Assignee: Sam Stein Associates, Inc., Sandusky, Ohio

[22] Filed: Feb. 12, 1970

[21] Appl. No.: 10,776

[52] U.S. Cl. ........................................................118/19
[51] Int. Cl. ........................................................A23g 3/26
[58] Field of Search ..........................................118/19; 68/139

[56] References Cited

UNITED STATES PATENTS

| | | | |
|---|---|---|---|
| 1,284,511 | 11/1918 | Wenzel | 68/139 |
| 1,374,938 | 4/1921 | McNulty | 118/19 |
| 3,225,735 | 12/1965 | Arcabasso | 118/19 |
| 3,408,980 | 11/1968 | Benson | 118/19 |

Primary Examiner—Henry S. Jaudon
Attorney—Baldwin, Egan, Walling & Fetzer

[57] ABSTRACT

A rotatable, generally cylindrical, drum is provided for coating a product, such as pieces of chicken, with bread crumbs or flour. The inside wall of the drum is provided with radially inwardly extending ribs, some of which are shorter for shaking the product and some of which are longer for flipping the product over. A sifter cage may be provided at the discharge end of the drum comprised of parallel rods all lying in a zone which is an extension of the drum wall zone.

8 Claims, 6 Drawing Figures

Patented March 14, 1972 3,648,648

INVENTORS
RICHARD D. JOHNSON
FRED FETZER
BY
Baldwin, Egan, Walling & Fetzer
ATTORNEYS

DRUM BREADER

An object of the present invention is to provide a simpe and foolproof apparatus for coating a product, such as pieces of chicken, with finely divided bread crumbs or flour in such a manner as to insure that the product is completely coated with the finely divided material and that all excess fine material is removed from the product when it leaves the apparatus.

Other objects and advantages of this invention will be apparent from the accompanying drawings and specification and the essential features thereof will be set forth in the appended claims.

In the drawings,

FIG. 5 is an end elevational view of a third embodiment of the drum; while

A difficult problem is presented in providing mechanical apparatus for thoroughly coating irregular food pieces, such as parts of chicken, with finely divided bread crumbs or flour so as to make certain that the irregularly shaped pieces are thoroughly coated and thereafter to insure that substantially all of the loose breading material is removed from the product upon discharge from the apparatus. The present invention is directed to this problem.

Figure 1:
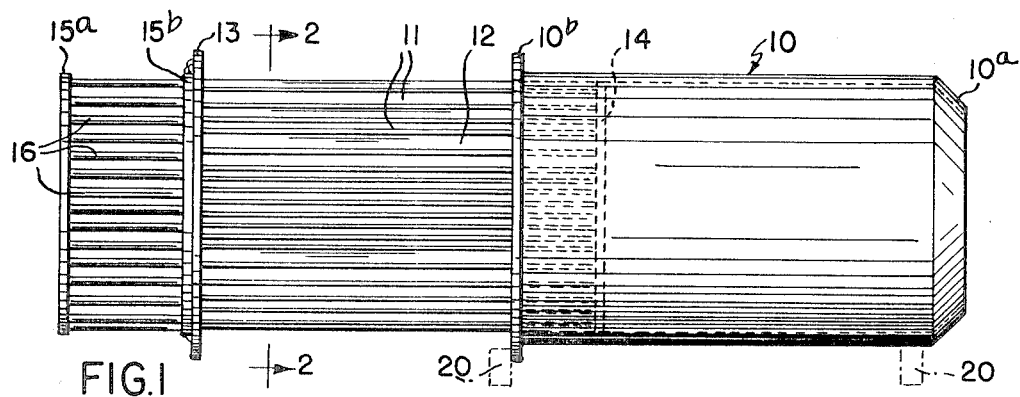
FIG. 1 is a side elevational view of a first embodiment of this invention, partly disassembled.

In FIG. 1, a generally cylindrical drum 10, of stainless steel or the like, preferably has its product-inlet end, seen at the right in FIG. 1, turned radially inwardly slightly as shown at 10a in a somewhat frustoconical form. Otherwise both ends of the drum are open. This invention provides a series of parallel ribs extending radially inwardly and running from end to end of the drum 10, these ribs being arranged in a repetitive pattern of a plurality of shorter ribs followed by a longer rib, the shorter ribs being of a radial extent to shake the product without flipping it over, and the occasional longer rib being of an extent to flip a product over as the breading drum revolves. In FIG. 1, these ribs are separate from the drum 10 and as more clearly seen in FIGS. 2 and 3 comprise a plurality of radially shorter ribs 11, followed by a radially longer rib 12, the pattern being repeated around the periphery of the drum. In this embodiment, each rib is linear and bent in cross section to U-shape or V-shape. The ribs are secured to circular end rings 13 and 14 rigidly, as by welding, as seen in FIG. 3. These ribs 11 and 12 are all parallel to each other and to the axis of drum 10. The radially outer edges 11a and 12a of the ribs lie in a circumference which is a close sliding fit with the radially inside circumference of the drum 10. Thus, the rib structure 11, 12, 13, 14, is a unit which may be slid toward the left out of the drum 10 for cleaning or inspection purposes and then pushed back inside of the drum when it is desired to operate the apparatus. When the rib structure is inside of the drum 10, means is provided for securing the end ring 13 of the rib structure to a radially outwardly extending annular flange 10b rigid with the drum at its product-discharge end. Such securing means is not shown here as it may be any conventional type.

Preferably, the breading drum is provided with means at its product-discharge end to remove excess breading material by a sifting action. To this end, there is shown in FIG. 1 a sifter cage 15 which comprises two parallel annular end rings 15a and 15b, between which are welded a plurality of spaced parallel straight rods 16 which are substantially parallel to the axis of drum 10 and which lie substantially in the zone which is an extension of the inner wall of drum 10. Preferably, the ring 15b of the sifter cage is welded to the end ring 13 of the rib structure, although other securing means might be provided.

In the second embodiment shown in FIG. 4 all of the parts are exactly like those described in connection with FIGS. 1,2 and 3 except for the sifter cage 17. Here, a plurality of parallel rods 18 are rigidly welded to the end rings 17a and 17b and again these rods lie substantially in a zone which is an extension of the inner wall of the drum 10. The difference, as compared to FIG. 1, is that the rods 18 are inclined outwardly away from the drum 10 and downstream from the arcuate path of travel of the coated food product at the product-discharge end of drum 10. In other words, as the product is rotated in drum 10 and in sifter cage 17, the angular disposition of the rods 18 cause the pieces of breaded product to be urged toward the left in FIG. 4. The angular inclination of the rods 18 with respect to a line on the drum wall parallel to its axis is preferably less than thirty degrees.

Figure 5:
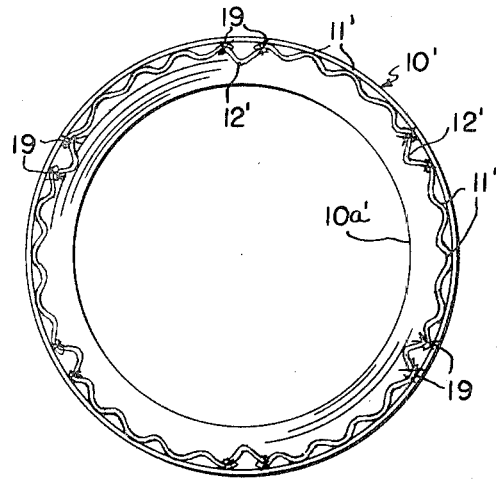

A third embodiment of the invention is shown in FIG. 5 where a generally circular drum 10' is provided and a single piece of sheet material running from end to end of the drum is corrugated to provide a plurality of product-shaking ribs 11'. A product flipover rib 12' of greater radial extent than the ribs 11' forms a single member running end to end of the drum 10'. This pattern is repeated around the inner circumference of the drum as clearly shown in FIG. 5. With the parts assembled as shown there, the members 11' and 12' are secured to each other and to the drum 10' as by welding at the points 19. Either sifter cage 15 or 17 may be secured to the discharge end of the drum 10' as previously described in the first and second embodiments.

Figure 6:
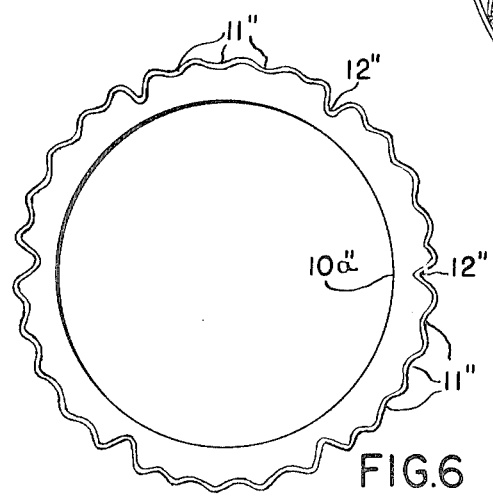
FIG. 6 is an end elevational view of a fourth embodiment of the breading drum of this invention.

A fourth embodiment is shown in FIG. 6 and here the material of the drum itself has been formed to provide a plurality of product-shaking ribs 11" with a product flipover rib 12", this pattern being repeated continually around the drum as previously explained.

It should be understood that in use of this breading drum, the same is rotated about its axis by any well known means. For instance, as indicated in the drawings, a pair of rollers 20 are supported for rotation about axes 20a which are supported on a suitable frame. These rollers are on opposite sides of the center line of the drum 10 and a pair of such rollers 20 is provided at opposite ends of the drum 10. The drum is tilted slightly toward the product-discharge end in the usual manner so that rotation of the drum by driving one or more of the rollers 20 will cause the product to be carried around the interior of the drum as it gradually progresses toward the discharge end. Rotatable drums through which a product travels are commonly supported and driven in the manner herein described and, therefore, further details of such structure are unnecessary to an understanding of the present invention.

Figures 2, 4:
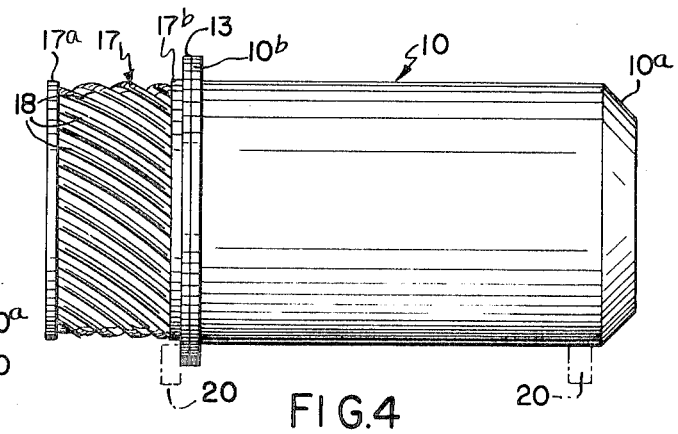
FIG. 2 is a sectional view taken along the line 2—2 of FIG. 1.
FIG. 4 is a side elevational view of a second embodiment, like FIG. 1, except for the construction of the sifter cage at the left-hand end of the apparatus.
Figure 3:
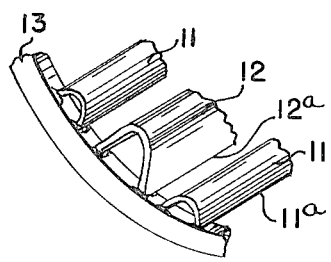
FIG. 3 is a fragmental perspective view, enlarged, taken at the point where the ribs of FIGS. 1 and 2 are attached to and end ring.

In use, the pieces of product to be breaded are introduced at the right-hand end of the drum as shown in FIGS. 1 or 4, or similarly in cases of FIGS. 5 and 6, and the product is coated with breading material which is deposited in the drum 10, 10' or the like. The coated product slides out of the left-hand end of the drum as shown in the drawings and excess breading material is shaken out in the sifter cage 15 or 17. The product is efficiently coated because the breading material is thoroughly shaken into the product by the shorter ribs 11, 11' or 11" and the product is periodically flipped over by the longer ribs 12, 12' or 12".

What is claimed is:

1. In a drum breader consisting of a generally cylindrical hollow drum adapted to be rotated about its axis, said drum open at its product-inlet and product-discharge ends, a continuous series of product manipulating ribs extending radially inwardly from the periphery of said drum and extending substantially from end to end of said drum, all of said ribs being parallel to the axis of said drum, said ribs being arranged in a repetitive pattern of a plurality of shorter ribs followed by a longer rib, said longer rib being of an extent to flip a product in said drum over as said drum revolves but being insufficient in radial extent to carry the product to a point near the top of said drum, said shorter ribs being of an extent to shake said product without flipping it over, all of said ribs being U-shaped opening outwardly, and sifter means at the discharge end of said drum.

2. A drum breader as defined in claim 1, wherein said sifter means includes a sifter cage extending away from said drum at the product-discharge end thereof, said cage comprising a plurality of spaced parallel rods all lying substantially in a zone which is an extension of said drum wall and all of said rods extending longitudinally away from said drum.

3. A drum breader as defined in claim 2, wherein said rods are inclined outwardly away from said drum and downstream from the arcuate path of travel of said product at the discharge end of said drum, whereby said rods aid the movement of said product away from the end of said drum.

4. A drum breader as defined in claim 2, wherein said rods are substantially parallel to the axis of said drum.

5. A drum breader as defined in claim 1, wherein said ribs are provided by integral portions of said drum extending inwardly.

6. A drum breader as defined in claim 1, wherein said ribs are separate from said drum and firmly secured thereto.

7. A drum breader as defined in claim 1, wherein said ribs are separate from said drum, circular hoops at opposite ends of said ribs and firmly secured thereto, said hoops and ribs slidable endwise into and out of said drum, and the parts being so arranged that said ribs closely engage the inner face of said drum when inserted therein.

8. A drum breader as defined in claim 7, including, as an integral structure with said hoops and ribs, as said sifter means, a sifter cage extending away from said drum at the product-discharge end thereof, said cage comprising a plurality of spaced parallel rods all lying substantially in a zone which is an extension of said drum wall and all of said rods extending longitudinally away from said drum.

* * * * *